(12) United States Patent
Park

(10) Patent No.: US 7,723,819 B2
(45) Date of Patent: May 25, 2010

(54) GRANULAR MAGNETIC LAYER WITH PLANAR INSULATING LAYER

(75) Inventor: Chang-Min Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 11/540,866

(22) Filed: Sep. 28, 2006

(65) Prior Publication Data

US 2008/0081221 A1    Apr. 3, 2008

(51) Int. Cl.
*H01L 21/20* (2006.01)

(52) U.S. Cl. .............................. 257/528; 257/4; 455/296

(58) Field of Classification Search ................. 455/572, 455/296; 257/2, 3, 4, 7, 528–543
See application file for complete search history.

(56) References Cited

U.S. PATENT DOCUMENTS

| | | | |
|---|---|---|---|
| 6,876,017 | B2 | 4/2005 | Goodner |
| 7,434,306 | B2 * | 10/2008 | Gardner ..................... 29/602.1 |
| 7,480,980 | B2 * | 1/2009 | Jung et al. ................. 29/602.1 |
| 7,531,824 | B1 * | 5/2009 | Johnson et al. ................ 257/2 |
| 2004/0000415 | A1 * | 1/2004 | Rizzo et al. ............... 174/35 R |
| 2004/0250411 | A1 * | 12/2004 | Gardner ..................... 29/602.1 |
| 2006/0071340 | A1 | 4/2006 | Zhong et al. |

OTHER PUBLICATIONS

Makarem Hussein, et al., "A Novel Approach to Dual Damascene Patterning", IEEE, 2002, pp. 18-20.

Masahiro Ito, et al., "Advanced Low-k Polymer Dielectrics Platform for RF Applications", 2005, The International Conf. on Compound Semiconductor Manuf. Tech., Paper 14.12.

M.D. Mukadam, et al., "Particle Size-Dependent Magnetic Properties of $\gamma\text{-}Fe_2O_3$ Nanoparticles", J. Magn. Mat., pp. 272-276, 1401-1403, 2004.

Y. Zhuang, et al., Magnetic Properties of Electroplated Nano/Microgranular NiFe Thin Films for RF Application, J. of Applied Phys., vol. 97, pp. 10N305-1-10N305-3, 2005.

Andricacos, P.C. , et al., "Future Directions in Electroplated Materials for Thin-Film Recording Heads", *IBM J. Res. Develop.*, vol. 42, No. 5, Sep. 1998, pp. 671-680.

Armyanov, S. , et al., "Crystalline and Amorphous Electroless CO-W-P. Coatings", *J. Of the Electrochemical Society*, vol. 152 (9), C612-C619(2005).

Carlier, Dany , et al., "Electrochemical Synthesis and Magnetic Properites of CoFe2O4 Nanowire Arrays", *J. Of the Electrochemical Society*, 153 (5) C277-C281.

Einati, H. , et al., "The Effect of Tungsten and Boron on the Cu Barrier and Oxidation Properties of Thin Electroless Cobalt-Tungsten-Boron Files", *Microelect. Eng.*, 82, (2005), pp. 623-628.

(Continued)

*Primary Examiner*—Blane J Jackson
(74) *Attorney, Agent, or Firm*—Blakely, Sokoloff, Taylor & Zafman LLP

(57) ABSTRACT

An embodiment of the present invention is a technique to fabricate a device using a magnetic layer. A magnetic layer having granular magnetic particles is formed. A planar insulating layer is deposited on the magnetic layer. The planar insulating layer has a planar surface and is made of a polymeric dielectric material with gap-filling capability to fill in gaps among the granular magnetic particles.

18 Claims, 5 Drawing Sheets

OTHER PUBLICATIONS

Huang, Qiyu, et al., "Observation of Isolated Nanopores Formed by Patterned Anodic Oxidation of Aluminum Thin Films", *Applied Physics Letters*, vol. 88, pp. 233112-1 to 233112-3, 2006.

Jiang, Hai, et al., "High Moment Soft FeCoN/NiFe Laminated Thin Films", *IEEE Trans. On Magnetics*, vol. 41, No. 10, Oct. 2005, pp. 2896-2898.

Kohn, A., et al., "The Role of Microstructure in Nanocrystalline Conformal $CO_{0.9}W_{0.02}P_{0.08}$ Diffusion Barriers for Copper Metallization", *Appl. Surf. Sci.*, (2003), 212-213, pp. 367-372.

Lagraff, J.R., et al., "Novel Method for Fabrication of Integrated Resistors on Bilayer Ag/YBa2Cu3O7 Films Using Ni Implantation", *Appl. Phys. Lett.*, 71, (15), Oct. 13, 1997, pp. 2199-2201.

Lagraff, J.R., et al., "Si Ion Implantation of SrTiO3 Passivated YBa2Cu3O6+x Films for Multilayer Processing of Electronic Circuits", *Physica C,.* 338(4) 269-283 (2000).

Liu, Bo, et al., "Effect of O-Implantation on the Structure and Resistance of Ge2Sb2Te5 Film", *Applied Surface Science* 242 (2005) pp. 62-69.

Osaka, Tetsuya, et al., "Microfabrication of Electro-and Electroless-Deposition and Its Application in the Electronic Field", Scient Direct, Surface and Coatings Technology, 169-170, pp. 1-7, 2003.

Park, Jae Y., et al., "Batch-Fabricated Microinductors with Electroplated Magnetically Anisotropic and Laminated Alloy Cores", *IEEE Trans. On Magnetics*, vol. 35, No. 5, Sep. 1999, pp. 4291-4300.

Sargunas, V., et al., "High Resistivity in n-Type InP by He+ Bombardment at 300 and 600 K", *Solid State Electronics, Solid-State Electronics*, vol. 38, Issue 1, Jan. 1995, pp. 75-81.

Severin, J.W., et al., "A Study on Changes in Surface Chemistry During the Initial Stages of Electroless Ni(P) Deposition on Alumina", J. Electrochem. Soc., vol. 140, No. 3, Mar. 1993, pp. 682-687.

Sun, R.D., et al., "Formation of Catalytic Pd on ZnO Thin Films for Electroless Metal Deposition", *J. Electrochem. Soc.*, vol. 145, No. 10, Oct. 1998, pp. 3378-3382.

Yokoshima, T., et al., "Increasing the Resistivity of Electrodeposited High Bs CoNiFe Thin Film", *IEEE Transactions on Magnetic*, vol. 35, No. 5, Sep. 1999.

Zhang, Y.D., et al., "Nanocomposite CoSiO2 Soft Magnetic Materials", *IEEE Trans. Magn.*, vol. 37, No. 4, Jul. 2001, pp. 2275-2277.

\* cited by examiner

GRANULAR MAGNETIC LAYER WITH PLANAR INSULATING LAYER

BACKGROUND

1. Field of the Invention

Embodiments of the invention relate to the field of semiconductor, and more specifically, to semiconductor fabrication.

2. Description of Related Art

On-chip devices such as voltage regulators have become increasingly popular in applications requiring low power, high frequency, and efficiency. Typically, these devices use magnetic material targeted for high frequency applications. One major problem with the design of on-chip devices is degraded efficiency or power loss from eddy currents at high frequency.

Existing techniques in the fabrication of magnetic components in high frequency on-chip devices have a number of drawbacks. One technique uses a continuous magnetic layer. This technique produces a large eddy current which leads to high power loss. Another technique uses granular magnetic particles to reduce the eddy currents. However, this technique does not allow subsequent processing such as metallization. Other techniques use materials such as Physical Vapor Deposition (PVD) cobalt-zirconium-tantalum (CoZrTa) alloy or electroless Cobalt Tungsten Boron Phosphorous (CoWBP). These materials have low resistivities in the range of 100-140 $\mu\Omega\cdot cm$. The low resistivity leads to high power loss due to eddy currents.

BRIEF DESCRIPTION OF THE DRAWINGS

Embodiments of invention may best be understood by referring to the following description and accompanying drawings that are used to illustrate embodiments of the invention. In the drawings.

DESCRIPTION

An embodiment of the present invention is a technique to fabricate a device using a magnetic layer. A magnetic layer having granular magnetic particles is formed. A planar insulating layer is deposited on the magnetic layer. The planar insulating layer has a planar surface and is made of a polymeric dielectric material with gap-filling capability to fill in gaps among the granular magnetic particles.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

An embodiment of the present invention is a technique to fabricate a magnetic layer used in a device or a component that uses a magnetic material such as an inductor. The technique provides granular magnetic particles in the magnetic layer and planar surface topology. The granular magnetic particles provide high effective resistivity, leading to reduced eddy current loss at high frequency operation. The planar surface enables subsequent processing such as metallization over the insulating layer.

Figure 1:
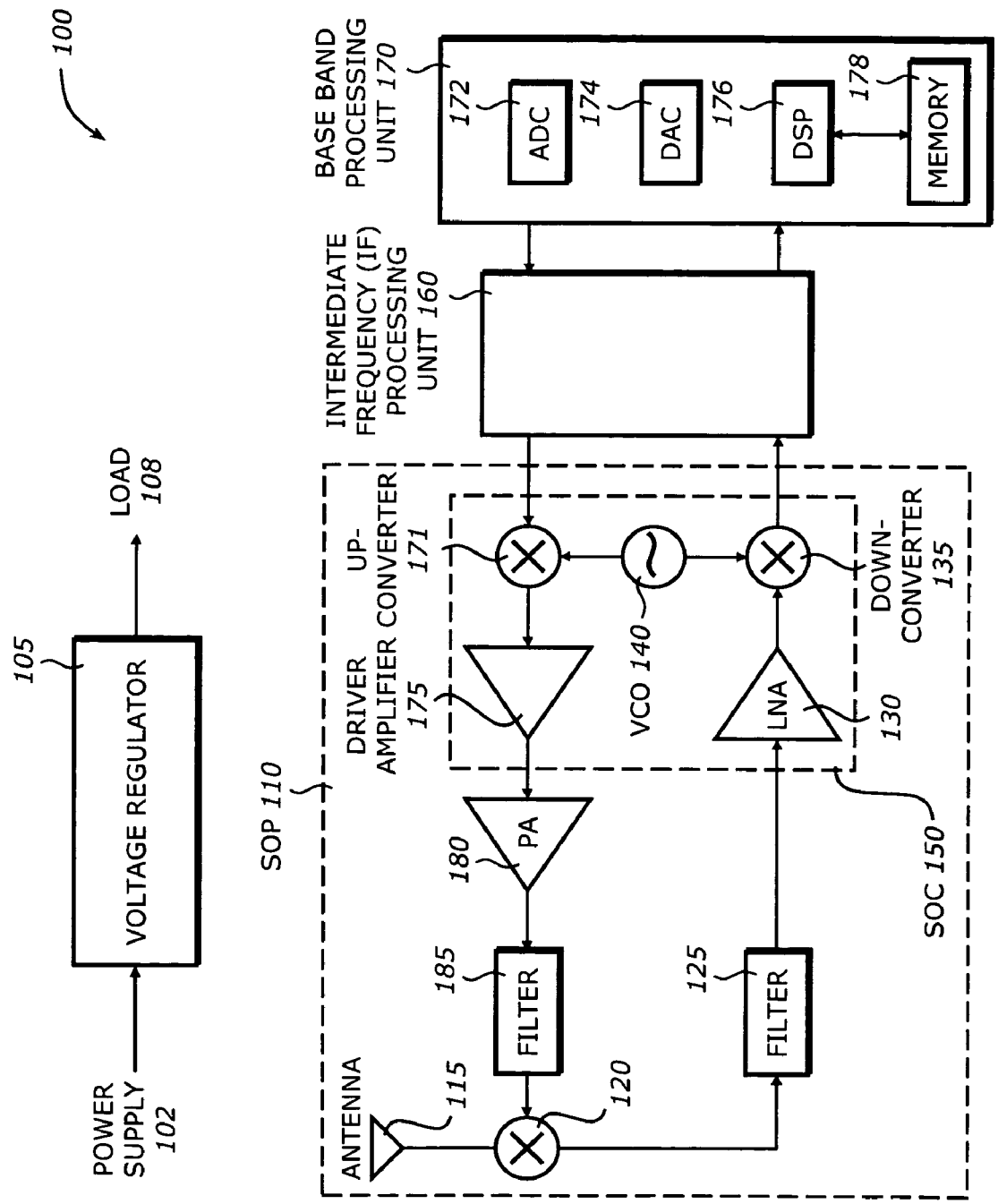
FIG. 1 is a diagram illustrating a system in which one embodiment of the invention may be practiced.

FIG. 1 is a diagram illustrating a system 100 in which one embodiment of the invention may be practiced. The system 100 represents a mobile communication module.

It includes a voltage regulator 105, a system on package (SOP) 110, an intermediate frequency (IF) processing unit 160, and a base-band processing unit 170.

The voltage regulator 105 may be an on-chip device. It receives power from a power supply 102 and delivers the power to a load 108. The load 108 may include all the units or devices in the system 100 or a portion of the system 100. The voltage regulator 105 regulates the voltage for the load 108 in response to fluctuations in power consumption of the load 108. The voltage regulator 105 may be part of the SOP 110, the IF processing unit 160, the base-band processing unit 170, or any combination of these. It may be fabricated on-chip or on-die in the same wafer with any of these units or any device in these units.

The SOP 110 represents the front end processing unit for the mobile communication module. It is a transceiver incorporating on-package integrated lumped passive components as well as radio frequency (RF) components. It includes an antenna 115, a duplexer 120, a filter 125, a system-on-chip (SOC) 150, a power amplifier (PA) 180, and a filter 185.

The antenna 115 receives and transmits RF signals. The RF signals may be converted to digital data for processing in subsequent stages. It may be designed in compact micro-strip and strip-line for L and C-band wireless applications. The duplexer 120 acts as a switch to couple the antenna 115 to the receiver and the transmitter to the antenna 115. The filters 125 and 185 may be C-band LTCC-strip-line filter or multilayer organic lumped-element filter at 5.2 GHz and narrowband performance of 200 MHz suitable for the Institute of Electrical and Electronic Engineers (IEEE) 802.11 wireless local area network (WLAN). The SOC 150 includes a low noise amplifier (LNA) 130, a down converter 135, a local voltage controlled oscillator (VCO) 140, an up converter 171, and a driver amplifier 175. The LNA 130 amplifies the received signal. The down converter 135 is a mixer to convert the RF signal to the IF band to be processed by the IF processing unit 160. The up converter 171 is a mixer to convert the IF signal to the proper RF signal for transmission. The VCO 140 generates modulation signal at appropriate frequencies for down conversion and up conversion. The driver amplifier 175 drives the PA 180. The PA 180 amplifies the transmit signal for transmission.

The IF processing unit 160 includes analog components to process IF signals for receiving and transmission. It may include a band-pass filter and a low pass filter at suitable frequency bands. The filter may provide base-band signal to the base-band processing unit 170. The base-band processing unit 170 may include an analog-to-digital converter (ADC) 172, a digital-to-analog converter (DAC) 174, a digital signal processor (DSP) 176, and a memory device 178. The ADC 172 and the DAC 174 are used to convert analog signals to digital data and digital data to analog signal, respectively. The DSP 176 is a programmable processor that may execute a program to process the digital data. The DSP 176 may be coupled to the front end processing unit via the IF processing unit 160 and/or the base-band processing unit 170 to process the digital data. The memory device 178 may contain code and/or data used by the DSP 176.

Figure 2:
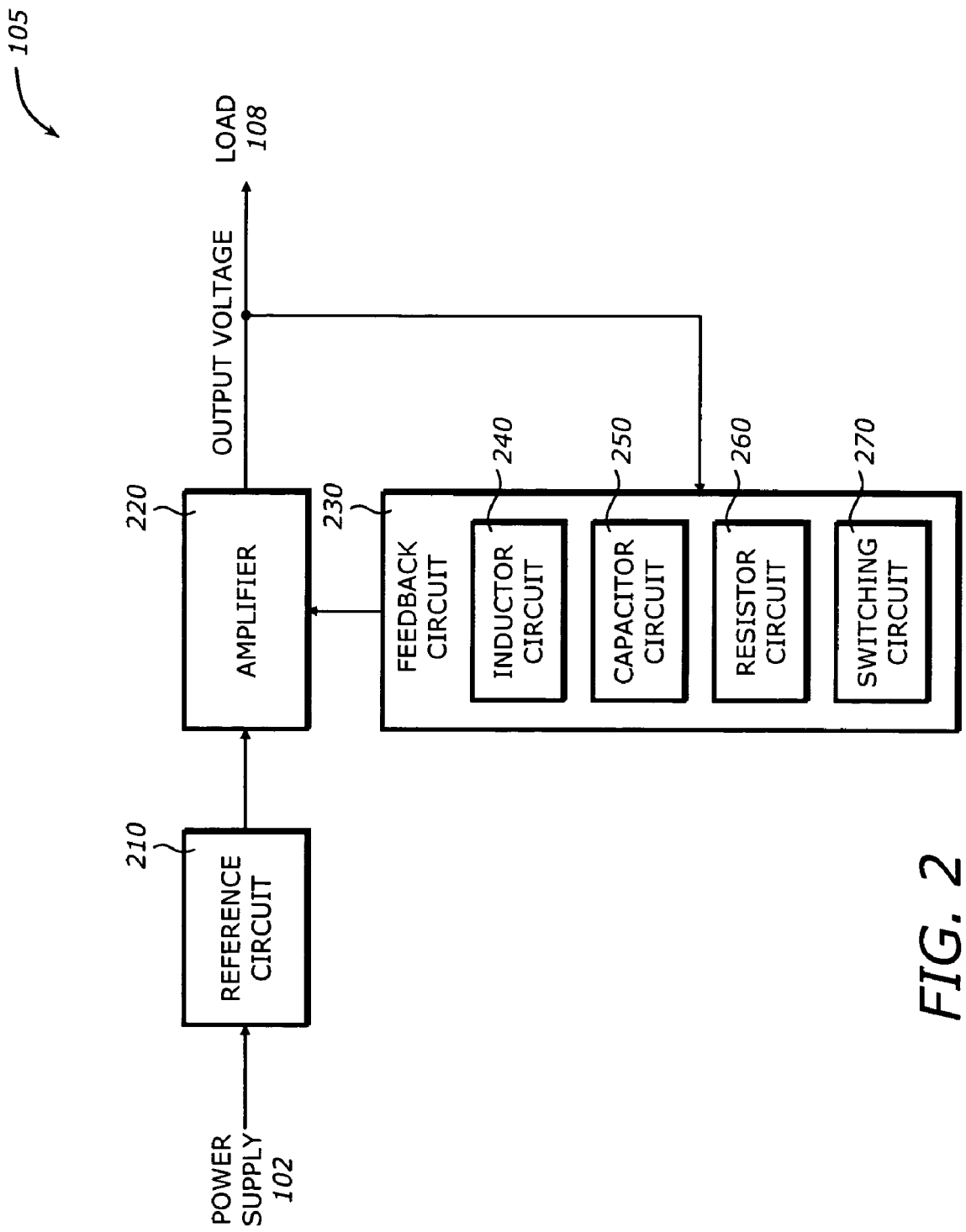
FIG. 2 is a diagram illustrating a voltage regulator according to one embodiment of the invention.

FIG. 2 is a diagram illustrating the voltage regulator 105 shown in FIG. 1 according to one embodiment of the invention. The voltage regulator 105 may be fabricated on-chip with any of the devices or units shown in FIG. 1. For example, it may be fabricated in the same wafer that contains the circuits of the SOC 150. The voltage 105 may include a reference circuit 210, an amplifier 220, and a feedback circuit 230.

The reference circuit 210 receives the input voltage from the power supply 102. This input voltage may be a varying voltage within a specified range. The reference circuit 210 provides a reference voltage to the amplifier 220. The amplifier 220 regulates the output voltage to the load 108 based on the reference voltage and the output of the feedback circuit 230. The amplifier 220 may be a comparator to compare the feedback voltage from the output of the feedback circuit 230 with the reference voltage. The output of the amplifier 220 may control a switching element (e.g., a transistor) to adjust the output. The feedback circuit 230 receives the output voltage to the load 108 and performs some filtering operations such as removing high frequency noise components. The feedback circuit 230 may include an inductor circuit 240, a capacitor circuit 250, a resistor circuit 260, and a switching circuit 270. The switching circuit 270 may include switching elements such as transistors to connect elements within the feedback circuit 230. For example, a terminal of a transistor may be connected to the output of the amplifier 220 so that the transistor may be turned on or turned off depending on whether the reference voltage is smaller or larger than the feed back voltage. The other terminal of the transistor may be connected to the output and to the load through the inductor circuit 240, the capacitor circuit 250, and the resistor circuit 260. The inductor circuit 240 may be fabricated together with the other circuits in the same wafer.

The inductor circuit 240, the capacitor circuit 250, and the resistor circuit 260 may form a filtering network that filters the output voltage to the load 108. The inductor circuit 240 may include one or more inductors which may be fabricated on-chip together with other components or devices. The conductor part in the inductor circuit 240 may define a signal path along which the current may flow to generate an electromagnetic field. The conductor may be shaped in any appropriate shape and may have multiple turns. Each turn may have a spiral, circular, hexagonal, or rectangular shape.

Figure 3:
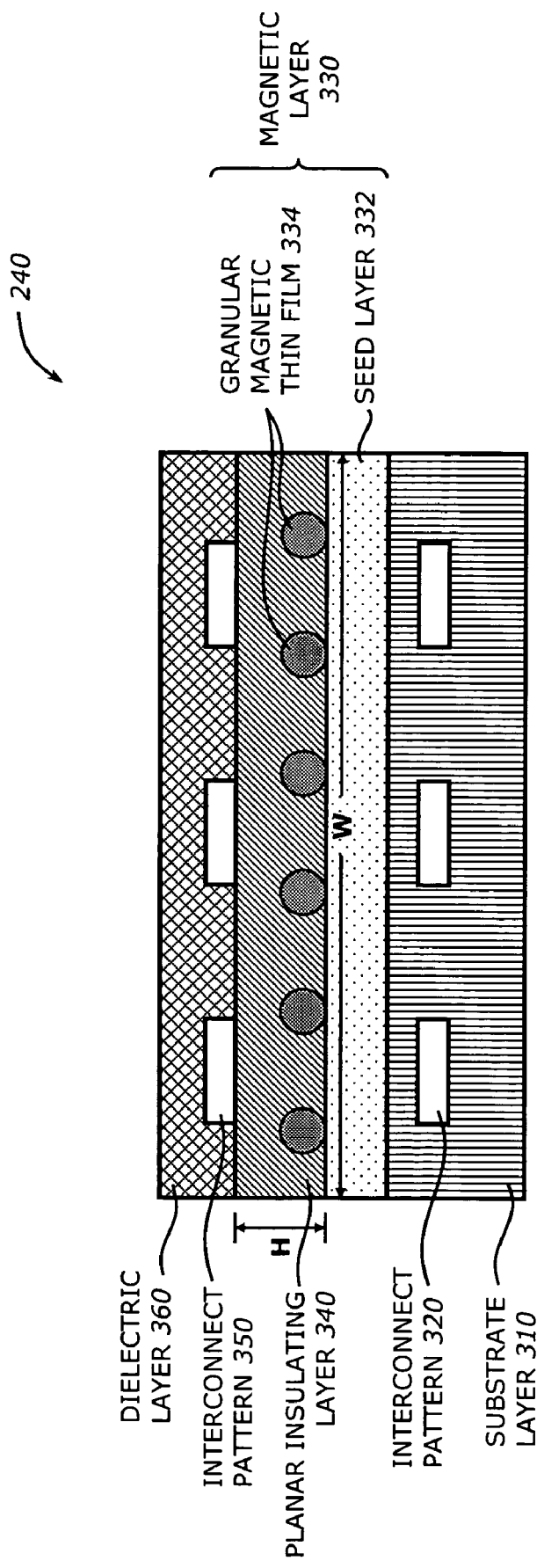
FIG. 3 is a diagram illustrating an inductor circuit according to one embodiment of the invention.

FIG. 3 is a diagram illustrating the inductor circuit 240 shown in FIG. 2 according to one embodiment of the invention. The inductor circuit 240 includes a substrate layer 310, an interconnect pattern 320, a magnetic layer 330, a planar insulating layer 340, an interconnect pattern 350, and a dielectric layer 360. Note that the inductor circuit 240 may include more or less than the above components.

The substrate layer 310 may be made from any suitable semiconductor material such as silicon (Si), germanium (Ge), or gallium arsenide (GaAs). The interconnect pattern 320 may include conductors of metal lines such as copper. The interconnect pattern 320 may carry current when power is applied. The interconnect pattern 320 may be deposited in the substrate layer 310 using any suitable fabrication technique. The interconnect pattern 320 may be separated from the magnetic layer 330 by a dielectric layer.

The magnetic layer 330 may include any suitable magnetic material. The magnetic material may have a relatively high permeability and a relatively high saturation magnetization so that the inductor circuit 240 may operate at high frequencies ranging above 1 MHz to several GigaHertz (GHz). It may have a height H and a width W. The height H may range from 0.1 $\mu$m to 5 $\mu$m. The width may be any desired width (e.g., 10 $\mu$m). There may also be more than one magnetic layer. In one embodiment, the magnetic layer 330 includes granular magnetic particles. The use of granular magnetic particles helps reduce eddy currents to reduce power loss by the eddy currents. The magnetic layer 330 includes a seed layer 332 and a granular magnetic thin film 334. The seed layer 332 may be formed by Titanium (Ti) or Chromium (Cr). The granular magnetic thin film 334 includes a thin layer of magnetic powder having a number of granular magnetic particles. The granular magnetic particles may be made of a magnetic material such as NiFe alloy. The granular magnetic particles may have diameters of approximately 1 $\mu$m. The particles may be separated by gaps having distances ranging from less than 1 $\mu$m to about 5 $\mu$m.

The planar insulating layer 340 is deposited on the magnetic layer 330. It has a planar surface. Such a planar surface may allow subsequent processing operations to be performed. These operations may include metallization, planarization, etching, contact attachment such as controlled collapse chip connection (C4), or assembly. The planar insulating layer 340 may be made of a polymeric dielectric material with gap-filling capability to fill in gaps among the granular magnetic particles. Examples of such a polymeric dielectric material may include spin-on polymers such as polyimide, Benzocyclobutene (BCB), and sacrificial light absorbing material (SLAM).

The interconnection pattern 350 may be similar to the interconnection pattern 320. It may include conductors of metal lines such as copper. The dielectric layer 360 may be deposited on the planar insulating layer 340 and the interconnect pattern 350 for further processing.

Figure 4:
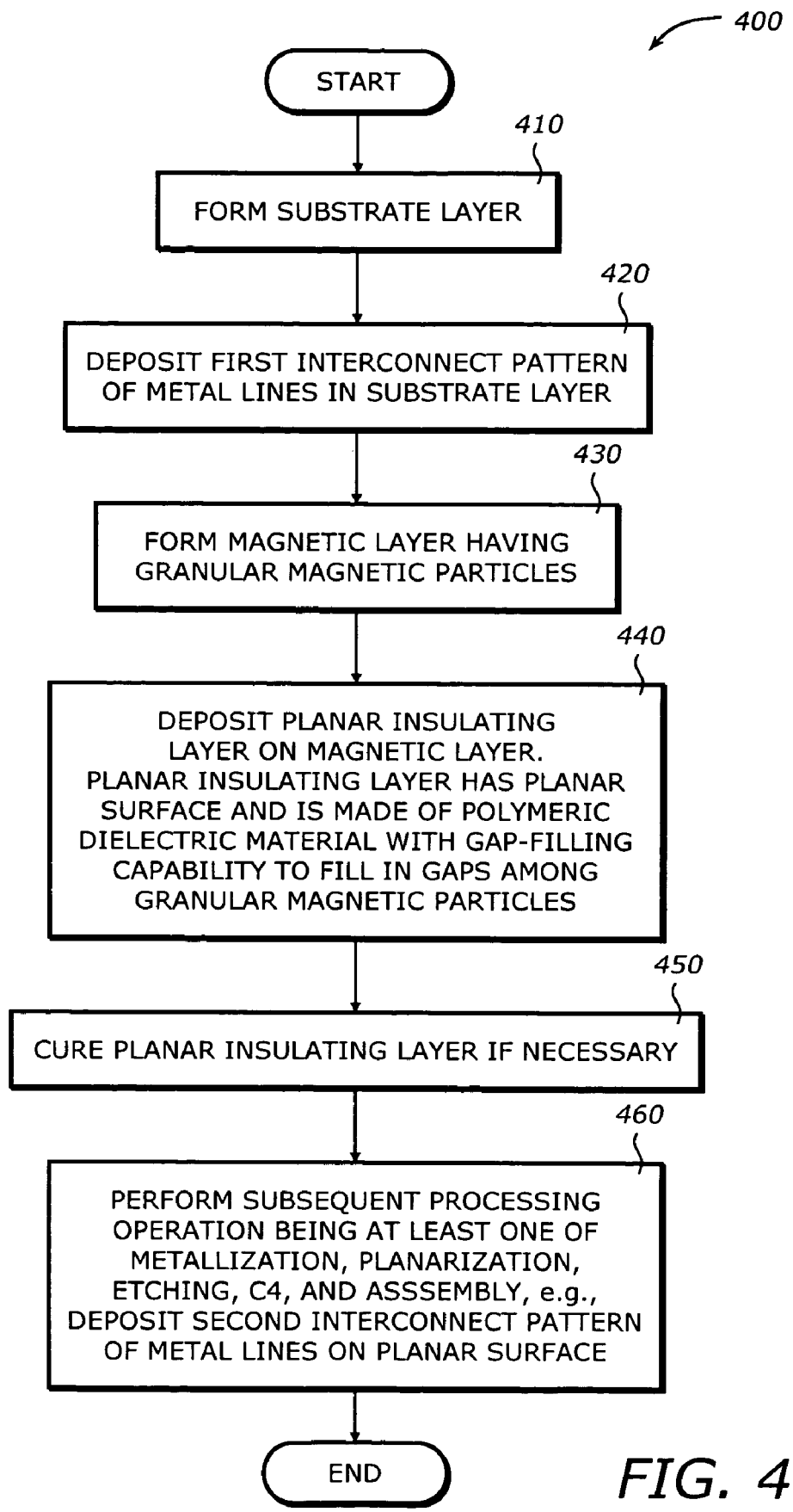
FIG. 4 is a flowchart illustrating a process to fabricate an inductor according to one embodiment of the invention.

FIG. 4 is a flowchart illustrating a process 400 to fabricate an inductor according to one embodiment of the invention.

Upon START, the process 400 forms a substrate layer (Block 410). The substrate layer may be made from Si, Ge, or GaAs. For on-chip inductor application, circuits including transistors and circuitry may be built before the magnetic structures are formed. Next, the process 400 deposits a first interconnect pattern of metal lines in the substrate layer (Block 420). The metal lines may be copper or any other suitable metal such as gold or metal alloy. The interconnect pattern may act as conductor to carry current when power is applied.

Then, the process 400 forms a magnetic layer having granular magnetic particles (Block 430). Next, the process 400 deposits a planar insulating layer on the magnetic layer (Block 440). The planar insulating layer may have a planar surface and be made of a polymeric dielectric material with gap-filling capability to fill in gaps among the granular magnetic particles in the magnetic layer.

Then, the process 400 cures the planar insulating layer if necessary (Block 450). The curing may be carried out at a temperature range and in a time period that are suitable according to the material of the planar insulating layer. For example, the temperature may range from 150° C. to 200° C. and the time period may be approximately an hour. Next, the process 400 performs a subsequent processing operation (Block 460). The operation may be at least one of a metallization, a planarization, an etching, a C4, or an assembly. In particular, the process 400 deposits a second interconnect pattern of metal lines on the planar surface. The process 400 is then terminated.

Figure 5:
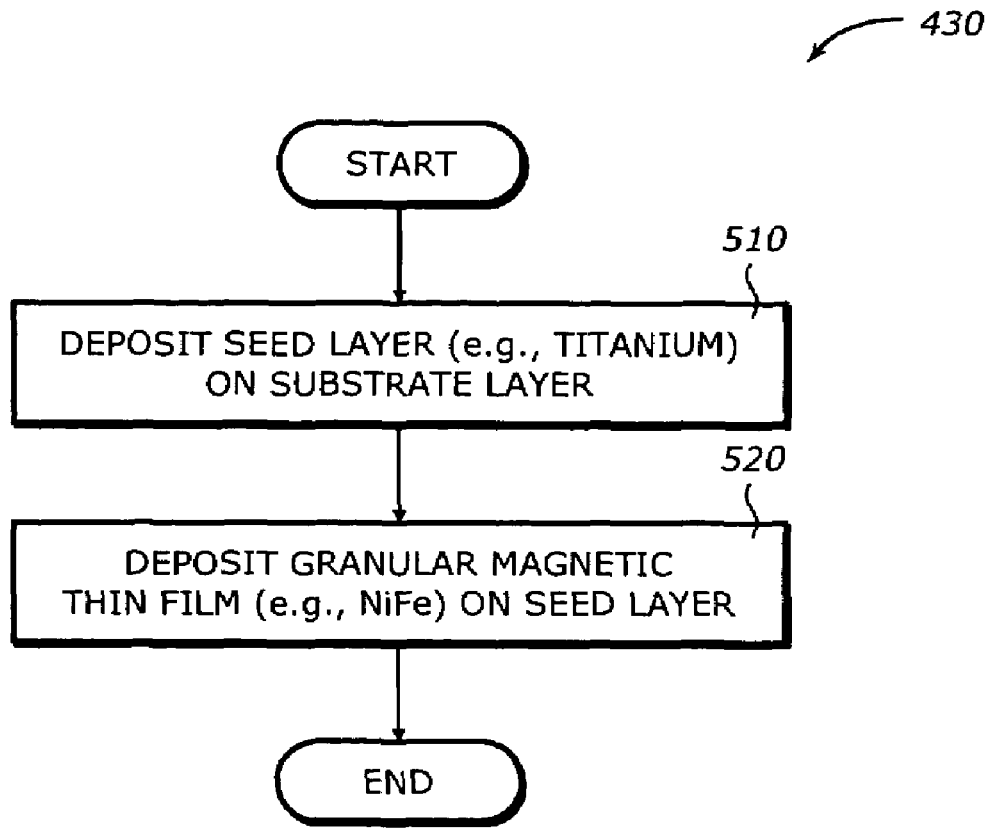
FIG. 5 is a flowchart illustrating a process to form a magnetic layer according to one embodiment of the invention.

FIG. 5 is a flowchart illustrating the process 430 shown in FIG. 4 to form a magnetic layer according to one embodiment of the invention.

Upon START, the process 430 deposits a seed layer on the substrate layer (Block 510). The seed layer may be made of Ti or Cr. Next, the process 430 deposits a granular magnetic thin film on the seed layer (Block 520). The granular magnetic thin film may be NiFe or similar alloy or compound. The process 430 is then terminated.

Figure 6:
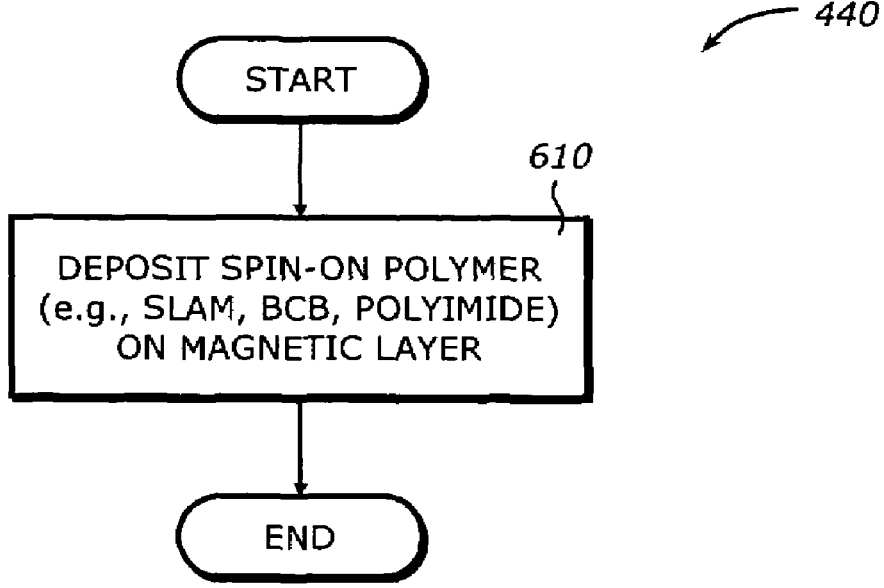
FIG. 6 is a flowchart illustrating a process to deposit a planar insulating layer according to one embodiment of the invention.

FIG. 6 is a flowchart illustrating the process 440 to deposit a planar insulating layer according to one embodiment of the invention.

Upon START, the process 440 deposits a spin-on polymer on the magnetic layer (Block 610) and is then terminated. Examples of spin-on polymers may include sacrificial light absorbing material (SLAM), Benzocyclobutene (BCB), and polyimide. Many of these spin-on polymers have excellent planar surface, gap-filling capability. Some of them have photo-definable characteristics. Any of the spin-on polymers that have planar surface and gap-filling capability may be used.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    forming a magnetic layer having granular magnetic particles; and
    depositing a planar insulating layer on the magnetic layer, the planar insulating layer having a planar surface and being made of a polymeric dielectric material with gap-filling capability to fill in gaps among the granular magnetic particles.

2. The method of claim 1 further comprising:
    performing a subsequent processing operation being at least one of a metallization, a planarization, an etching, a controlled collapse chip connection (C4), and an assembly.

3. The method of claim 2 wherein performing a subsequent processing operation comprises:
    depositing a second interconnect pattern of metal lines on the planar surface.

4. The method of claim 1 further comprising:
    forming a substrate layer; and
    depositing a first interconnect pattern of metal lines in the substrate layer.

5. The method of claim 4 wherein forming the magnetic layer comprises:
    depositing a seed layer on the substrate layer; and
    depositing a granular magnetic thin film on the seed layer.

6. The method of claim 5 wherein depositing a seed layer comprises:
    depositing the seed layer made of Titanium or Chromium.

7. The method of claim 5 wherein depositing the granular magnetic thin film comprises:
    depositing the granular magnetic thin film made of NiFe alloy.

8. The method of claim 1 further comprising:
    curing the planar insulating layer.

9. The method of claim 1 wherein depositing a planar insulating layer comprises:
    depositing a spin-on polymer on the magnetic layer.

10. The method of claim 9 wherein depositing the spin-on polymer comprises:
    depositing one of at least a sacrificial light absorbing material (SLAM), a polyimide, and Benzocyclobutene (BCB) on the magnetic layer.

11. A device comprising:
    a magnetic layer having granular magnetic particles; and
    a planar insulating layer deposited on the magnetic layer, the planar insulating layer having a planar surface and being made of a polymeric dielectric material with gap-filling capability to fill in gaps among the granular magnetic particles.

12. The device of claim 11 further comprising:
    a subsequent layer being at least one of a metallization, a controlled collapse chip connection (C4), and an assembly.

13. The device of claim 12 wherein the subsequent layer comprises:
    a second interconnect pattern of metal lines on the planar surface.

14. The device of claim 11 further comprising:
    a substrate layer; and
    a first interconnect pattern of metal lines deposited in the substrate layer.

15. The device of claim 14 wherein the magnetic layer comprises:
    a seed layer on the substrate layer; and
    a granular magnetic thin film deposited on the seed layer.

16. The device of claim 15 wherein the seed layer is made of Titanium or Chromium.

17. The device of claim 15 wherein the granular magnetic thin film is made of NiFe alloy.

18. The device of claim 11 wherein the planar insulating layer comprises a spin-on polymer.

* * * * *